United States Patent [19]

Forlani

[11] 4,064,797

[45] Dec. 27, 1977

[54] BACON COOKING DEVICE

[76] Inventor: Al Forlani, 811 Hibiscus Lane, Vero Beach, Fla. 32960

[21] Appl. No.: 673,282

[22] Filed: Apr. 2, 1976

[51] Int. Cl.² .......................................... A47J 37/00
[52] U.S. Cl. ..................................... 99/341; 99/349; 99/400; 99/426
[58] Field of Search ................. 99/341, 349, 400, 446, 99/425, 426, 422, 401, 439, 428

[56] References Cited

U.S. PATENT DOCUMENTS

| | | | |
|---|---|---|---|
| 1,502,894 | 7/1924 | Anschutz | 99/422 |
| 2,080,171 | 5/1937 | Fairbanks et al. | 99/341 |
| 3,466,998 | 9/1969 | Musgrove | 99/400 |
| 3,555,993 | 1/1971 | Garcia | 99/426 |
| 3,713,379 | 1/1973 | Gordy | 99/349 |

FOREIGN PATENT DOCUMENTS 639,385   6/1950   United Kingdom ................. 99/341

Primary Examiner—Billy J. Wilhite
Attorney, Agent, or Firm—Robert D. Farkas

[57] ABSTRACT

A device especially adapted for use in connection with an oven, for facilitating the cooling of bacon therein by providing for a rack for holding the same during the cooking operation.

6 Claims, 3 Drawing Figures

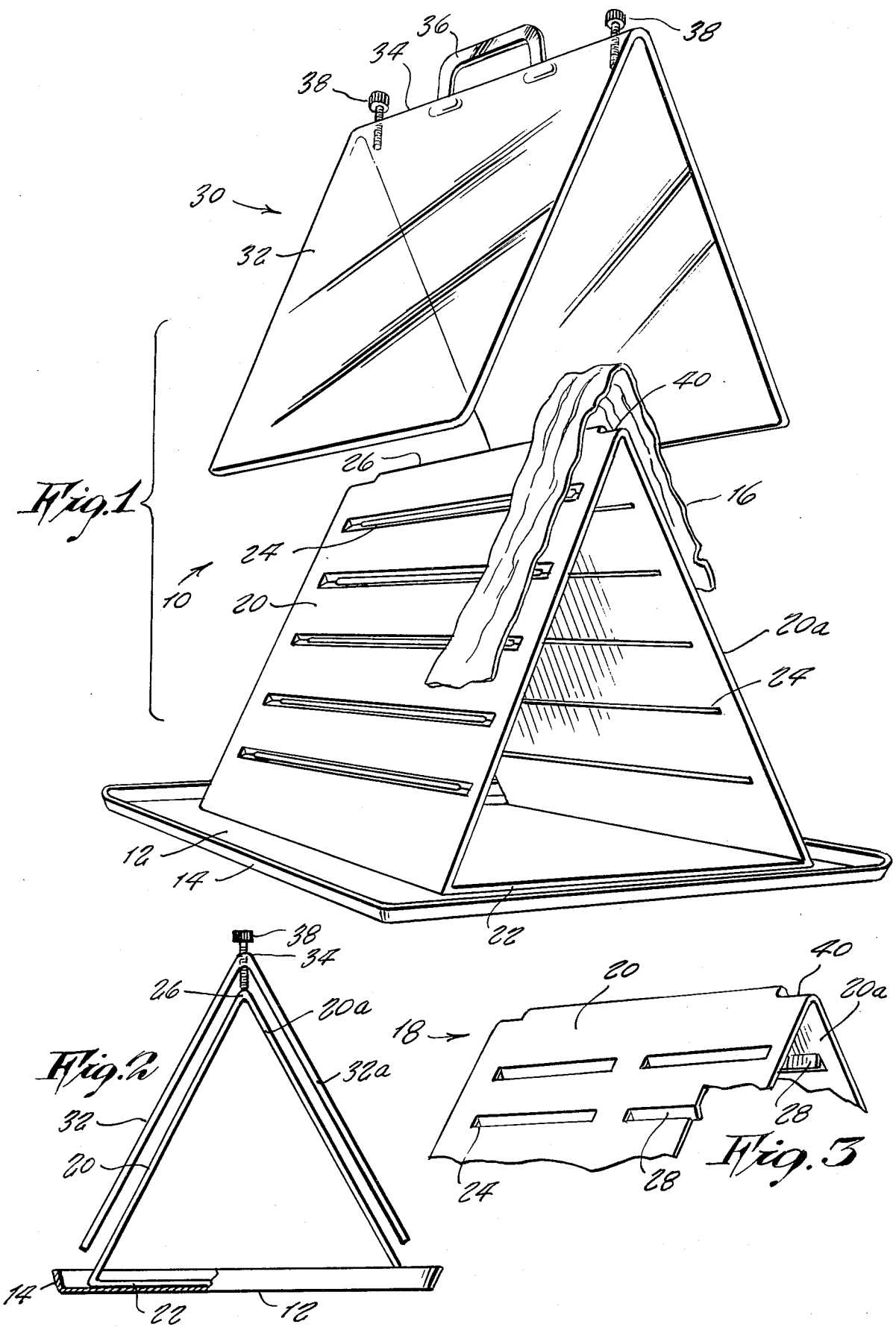

BACON COOKING DEVICE

BACKGROUND OF THE INVENTION

This invention relates to a device for use in connection with the cooking of bacon strips in an oven; more particularly, to provide a support surface and means for facilitating removal of the cooking grease away from the bacon strips.

The prior art teaches a variety of appliances and devices for use in connection with the cooking of bacon strips and the like, for example, as disclosed in U.S. Pat. Nos. 2,080,171; 3,010,383; 3,019,721; 3,321,314; 3,528,361; 3,593,648; 3,713,379; and others. None of the foregoing are however, suitable for the cooking of bacon strips directly within the oven chamber.

SUMMARY OF THE INVENTION

It is accordingly an object of the instant invention to provide for an improved bacon-cooking device.

It is another object to provide for such a device that is used directly within the oven chamber.

It is a further object to provide for the same at relatively little cost thereby making it generally available.

These and other objects and advantages of the invention will become more apparent from the following detailed disclosure and claims and by reference to the accompanying drawings, in which:

FIG. 1 is a perspective view thereof;

FIG. 2 is an end elevational view; and

FIG. 3 is a detailed perspective view showing an alternate embodiment.

Broadly speaking, the instant invention includes the provision of an oven proof bacon strip cooking aid for use in connection with the cooking of bacon in the chamber of an oven, comprising a tray portion having upwardly inclined side walls, the tray adapted to receive and retain cooking grease from the bacon, a bacon support member including two inclined side walls converging at an apex to receipt of the bacon thereon, the side walls defining a plurality of elongated apertures adapted to channel the grease off of the side walls and into the tray, a cover portion comprised of two inclined walls converging at an apex, the cover portion having an internal area greater than the bacon support member whereby the cover portion fits thereover and cooperates therewith handle means disposed on the apex of the cover, at least one movable pressure means on the cover apex adapted to engage the apex of the bacon support member whereby the cover portion may be fitted thereover for contact with the bacon.

DETAILED DISCLOSURE

Referring more particularly to the drawings, there is shown a bacon-strip cooking aid 10 that generally includes a tray portion 12 having a perimeter lip and raised flange 14 therearound; the tray 12 to catch and hold grease dripping from the bacon 16 while the lip 14 prevents the grease from running off the side of the tray 12. In combination therewith, either unitary or separable therefrom there will be a generally triangular shaped member 18 having two converging, inclined side walls 20, 20a and optionally a base portion 22 adapted to rest upon the tray 12; though the ends of the side walls may also rest or be unitary with the tray 12. Disposed along the side walls 20, 20a there will be a plurality of elongated slits as apertures 24 that preferably run transverse or horizontal relative to the walls 20, 20a to provide release of the grease that drips downward from the bacon strip 16 disposed over the apex 26 formed by the converging walls 20, 20a. The slits 24 will preferably define inwardly inclined (towards the space defined between the walls 20, 20a) side portions to channel the grease dripping off of the outer surface of the walls 20, 20a and towards the inner surface thereof. An alternate embodiment, as shown in FIG. 3 provides for rib portions 28 to be disposed along the perimeter of the slit 24, running inwardly towards the center space between the walls 20, 20a, to more effectively drain the grease away. In cooperation with the member 18 there will be a like member 30, having only two converging, inclinded walls 32, 32a, however, which will have a slightly larger internal area such that it is adapted to fit over the member 18. The length of its walls 32, 32a, will preferably be not a great as that of member 18, i.e., it will not contact the tray 12. The apex 34 of member 30 will include suitable handle means 36 to facilitate movement of the same. These will also preferably be disposed on the apex 34 thereof at least one, preferably two, spacing means 38, i.e., set screws, to facilitate the application of pressure by the walls 32, 32a against the bacon 16 and to hold the member 30 onto the member 18. An aperture will be provided in the apex 34 for receiving the means 38 which will thereupon contact the apex 26 of the member 18, at a point 40 thereon which may be suitably planar for engagement of the same, such as by a shoulder portion and base defined on the apex 26. The member 30 is preferably constructed of transparent oven proof material, i.e., pyrex glass, polycarbonate, etc; while the member 18 and tray 12 may be any other oven proof material i.e., aluminum, ceramic, etc, or the same as member 30. The entire unit being placed in the oven for the cooking of the bacon.

Since it is obvious that numerous changes and modifications can be made in the above-described details without departing from the spirit and nature of the invention, it is to be understood that all such changes and modifications are included within the scope of the invention.

I claim:

1. An oven proof bacon-strip cooking air for use in connection with the cooking of bacon in the chamber of an oven, comprising a tray portion having upwardly inclined side walls, said tray portion adapted to receive and retain cooking grease from said bacon, a bacon support member including two inclined side walls converging at an apex for receipt of said bacon thereon, said side walls defining a plurality of elongated apertures adapted to channel said grease off of said side walls and into said tray portion, a cover portion comprised of two inclined walls converging at an apex, said cover portion having an internal area greater than said bacon support member whereby said cover portion fits thereover and cooperates therewith, handle means disposed on said apex of said cover, spacing means on said cover apex adapted to engage the apex of said bacon support member whereby said cover portion may be adjustably spaced thereover and for pressing on said bacon.

2. The aid as defined in claim 1 wherein said cover portion is a transparent material.

3. The aid as defined in claim 1 wherein said spacing means comprises a set screw, said apex of said cover defines an aperture for receipt of said screw and the apex of said support member includes a substantially planar surface for engagement with said screw.

4. The aid as defined in claim 1 wherein said support member includes a base portion in contact with said tray portion.

5. The aid as defined in claim 1 wherein said elongated apertures includes inwardly inclined side wall portions, said side wall portions, inclined towards the area defined between said two converging walls.

6. The aid as defined in claim 1 wherein said apertures are horizontally disposed relative to said walls.

* * * * *